United States Patent [19]
Fredlund et al.

[11] Patent Number: 6,147,743
[45] Date of Patent: Nov. 14, 2000

[54] METHOD AND APPARATUS FOR PROVIDING ZOOM AND CROP FUNCTIONS IN A PHOTOGRAPHIC PRINT COPYING STATION

[75] Inventors: John R. Fredlund, Rochester; William C. Archie, Pittsford, both of N.Y.

[73] Assignee: Eastman Kodak Company, Rochester, N.Y.

[21] Appl. No.: 09/144,392

[22] Filed: Aug. 31, 1998

[51] Int. Cl.[7] ............................. G03B 29/00; G03B 27/52
[52] U.S. Cl. ................................................ 355/29; 355/40
[58] Field of Search ........................... 355/27–29, 40–41, 355/32, 56, 74; 382/174–175; 358/448–450, 474

[56] References Cited

U.S. PATENT DOCUMENTS

| | | | |
|---|---|---|---|
| 4,763,989 | 8/1988 | Christian | 350/319 |
| 4,961,090 | 10/1990 | Gray, Jr. et al. | 355/50 |
| 4,970,547 | 11/1990 | Desai | 355/61 |
| 5,045,878 | 9/1991 | Taeger | 355/74 |
| 5,115,271 | 5/1992 | Hagopian | 355/74 |
| 5,173,789 | 12/1992 | Renner et al. | 358/475 |
| 5,357,313 | 10/1994 | Lewin et al. | 355/74 |
| 5,631,747 | 5/1997 | Farrell et al. | 358/448 |
| 5,796,496 | 8/1998 | Ono | 358/498 |

*Primary Examiner*—Russell Adams
*Assistant Examiner*—Hung Henry Nguyen
*Attorney, Agent, or Firm*—Thomas H. Close

[57] ABSTRACT

A photographic print copying station includes a scanner for scanning a photographic print. A mask is placed over the photographic print to indicate an area of the print for copying and an operator control is provided on the copying station for selecting a desired copy size. The copying station includes a logic and control circuit that responds to the signal produced by the scanner to recognize the mask area, separates the image area from the mask area, and resizes the image area to the selected copy size. The resized image is then printed by a printer in the copying station.

11 Claims, 4 Drawing Sheets

METHOD AND APPARATUS FOR PROVIDING ZOOM AND CROP FUNCTIONS IN A PHOTOGRAPHIC PRINT COPYING STATION

FIELD OF THE INVENTION

The present invention relates to the field of manually operated photographic print copying stations, and in particular to a method and apparatus for providing zoom and crop functions in such stations.

BACKGROUND OF THE INVENTION

Photographic print copying stations whereby a customer can scan a color or black and white picture and produce a copy of the picture are well known. An example of such a copying station is the Kodak IMAGE MAGIC Picture Maker, manufactured by the Eastman Kodak Company, Rochester, N.Y., which includes a flat bed scanner, a monitor having a touch screen input device, an image processing computer, and a color thermal printer.

In operation, a menu with instructions is displayed on the touch screen. The customer is instructed to indicate the size of the original picture and then to select a print layout. Print layouts can be for example one 8×10, two 5×7's, or a number of wallet size images arranged on an 8×10 sheet. After the initial selections are made, the customer is instructed to place the picture on the bed of the scanner and activate a button on the touch screen to begin scanning. The scanned image is then displayed on the touch screen and the customer can apply a set of editing tools, including zoom and crop. For zoom and crop, a red box is shown on the displayed image. The size, orientation and location of the box can be manipulated using buttons on the touch screen. When the customer is finished with editing the image, she is instructed to verify the result and to print the image by activating a button on the touch screen.

As with any such equipment that provides a service and uses consumable goods (i.e. printing materials), a good portion of the profit gained from the equipment is in the use of the equipment and sales of the consumable materials. Although photographic print copying stations of this type have proven to be very popular, their relatively high initial equipment cost limits the wide availability of the stations to the public, and hence limits the income derived from their use and consumption of the materials. One significant component of the high cost of such stations is the interface which allows the user to zoom and crop the image. It is desirable to provide a means for zoom and crop which is easy to understand and use while being much less expensive than present methods. There is a need therefore for a less costly version of such a photographic print copying station.

SUMMARY OF THE INVENTION

The problem noted above is solved according to the present invention by providing a photographic print copying station that includes a scanner for scanning a photographic print and a mask associated with the scanner. The mask is placed over the photographic print to indicate an area of the print for copying and an operator control is provided on the copying station for selecting a desired copy size. The copying station includes a logic and control circuit that responds to the signal produced by the scanner to recognize the mask area, separate the image area from the mask area, and resize the image area to the selected copy size. The resized image is then printed by a printer in the copying station.

ADVANTAGES

The copying station of the present invention has the advantage of being less expensive to manufacture than the prior art photographic print copying station. It is also smaller, lighter, and requires less maintenance since it does not include a monitor and touch screen. The copying station of the present invention has the further advantage that while one customer is scanning a picture and printing a copy, other customers may be engaged in aligning their pictures in a mask, thereby increasing the throughput of the copying station.

DETAILED DESCRIPTION OF THE INVENTION

Figure 1:
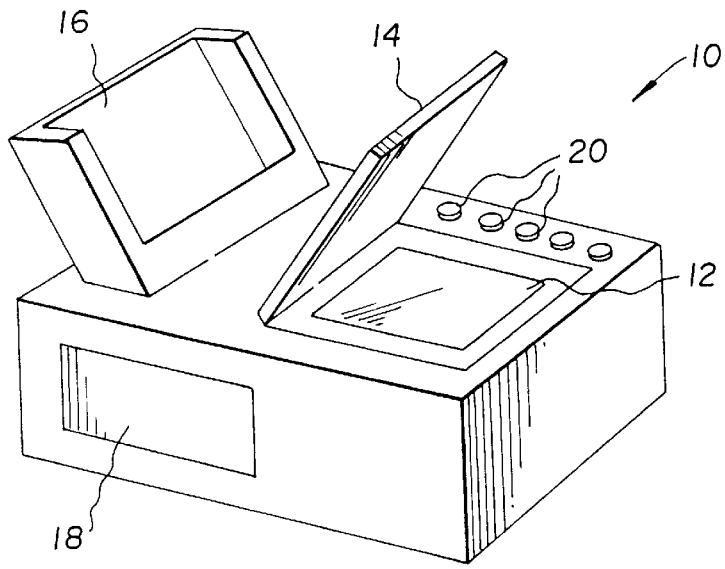
FIG. 1 is perspective view of a photographic copying station according to the present invention.

Referring first to FIG. 1, a photographic print copying station, generally designated 10, according to the present invention is shown. The copying station 10 includes a platen 12 having a cover 14, a print eject tray 16, a media supply door 18, and a set of control buttons 20. According to the present invention, a separate display device is not used to assist the user in zooming and cropping a print, thereby saving the manufacturing expense of adding a monitor and touch sensitive screen to the station. Instead, the necessary visual feedback is provided to the user and to the copying station electronics by an inexpensive physical mask which is placed over the print, exposing only the portion of the picture which is to be printed. The control electronics in the copy station recognizes the area of the mask, separates the image area from the mask area, and resizes the image area to the selected copy size. Since these functions are implemented by software in the control electronics, the marginal costs for providing the functions, plus the cost of the physical mask(s) is much less than the cost of a monitor with a touch sensitive screen, thereby significantly reducing the cost of manufacturing the copying station.

Figure 2:
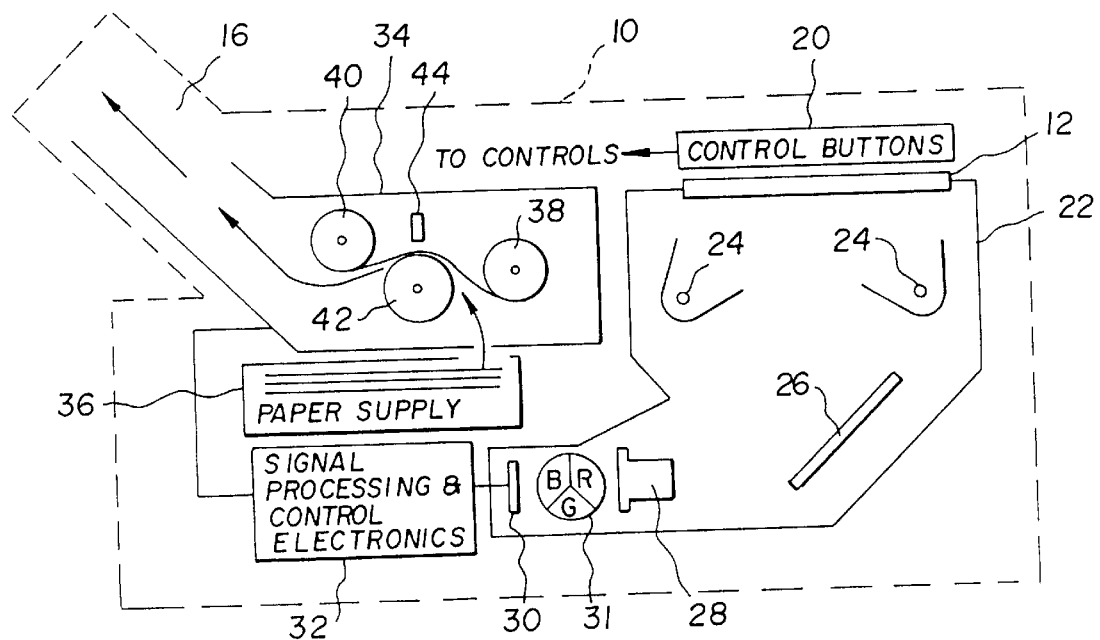
FIG. 2 is a schematic block diagram of the photographic copying station shown in FIG. 1.

Referring to FIG. 2, the copying station 10 includes a scanner 22 of the type well known in the art, having transparent platen 12, an illumination source, such as a pair of flash lamps 24, a mirror 26, a lens 28, and an image sensor 30. Image sensor 30 may comprise for example a solid state area array image sensor such as the KAF0400 manufactured by the Eastman Kodak Company, Rochester, N.Y. A color filter wheel 31 is positioned with respect to sensor 30 and rotated to provide sequential red, green and blue separation images to sensor 30. The image signals generated by the image sensor 30 are processed by signal processing and control electronics 32 as will be described below.

The signal processing and control electronics 32 includes, for example, a micro processor and associated memory for performing digital image signal manipulations. The signal processing and control electronics 32 receives control signals from control buttons 20 and supplies the processed image signals to a color printer 34. The color printer 34 is for example, a thermal printer of the type well known in the art, having a paper supply 36, a thermal print dye donor supply 38 and take-up 40, a print drum 42, and a thermal print head 44. The color printer 34 ejects the finished print into the print eject tray 16.

Figure 3:
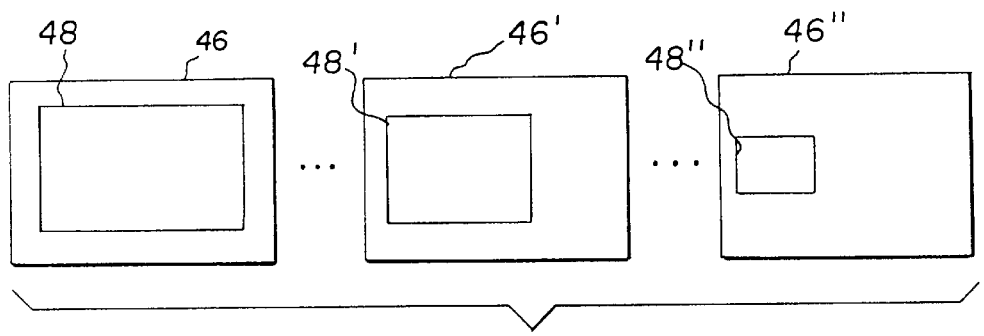
FIG. 3 is a top view of a set of masks useful with the present invention.
Figure 4:
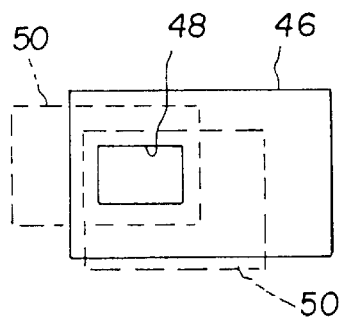
FIG. 4 is a schematic diagram illustrating the use of one of the masks in the set.

Turning now to FIGS. 3 and 4, the cropping mask according to the present invention will now be described. As shown in FIG. 3, a series of masks 46, 46', 46" may be provided, each having a different sized cropping aperture 48, 48', 48". The cropping mask may be made for example from cardboard, or sheet plastic and can be white, or some unnatural color to assist the signal processing electronics in separating the image of the mask from the selected image area of the picture. One well known process for separating an object from a background is called the chroma key process, wherein a blue screen is placed behind actors in a scene, and in subsequent processing, the background is separated from the actors by recognizing the color of the background. The minimum size of the cropping aperture 48 is limited by the resolution of the scanner 22, since the output print cannot be enlarged beyond a certain point without unacceptable loss of sharpness. Preferably, the cropping aperture has the same aspect ratio as the selected desired copy size. As shown in FIG. 4, in use the mask 46 is placed over the picture 50 and arranged such that the desired part of the picture shows through the cropping aperture 48. The picture with the mask in place is then placed face down on the platen 12 of the copying station 10, with the mask between the picture and the platen, and the cover 14 is closed over the picture and mask. The operator then uses one of the buttons 20 to select the desired size of the output and to initiate the copying of the selected portion of the picture.

Alternatively, the color of the mask may indicate to the copy station electronics that a desired output has been selected. Thus the interface may be further simplified in that the selection of the mask of appropriate color may also select the output format. This is advantageous since standard output sizes have differing aspect ratios, and therefore the openings in the masks should match the aspect ratio of the desired output.

Alternatively, a bar code or other machine readable code may be visible on the face of the mask to provide information to the computer as to the desired output format. This means can also provide the advantages described above for the colored masks.

Figure 5:
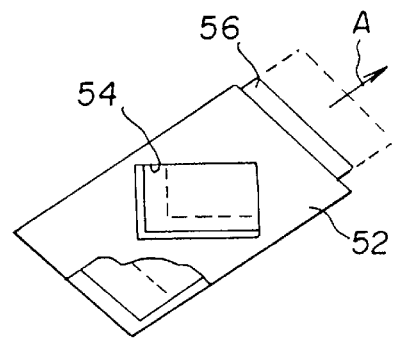
FIG. 5 is top view of an adjustable mask useful with the present invention.

As an alternative to the mask set shown in FIG. 3, an adjustable mask of the type shown in U. S. Pat. No. 4,763,989, issued Aug. 16, 1988 to Gregory L. Christian may be provided, the disclosure of which is incorporated herein by reference. FIG. 5 shows an example of such a mask, which includes a sleeve 52 having a rectangular aperture 54 arranged at an angle to the sleeve. A slide 56 located in the sleeve has a corresponding aperture, and when the slide 56 is displaced in the direction of arrow A, the size of the cropping aperture in the sleeve changes continuously (as shown by the dotted lines in FIG. 5) while preserving the cropping aperture proportion as the aperture size changes.

It should be noted that the application of the mask to the picture can occur without the involvement of the copying station. Thus while one user is making a copy, other users can prepare images for copying, thereby maximizing the throughput of the copying station.

Figure 6:
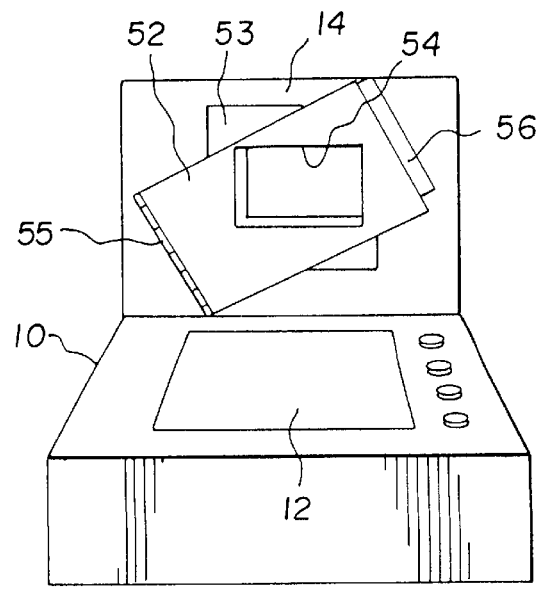
FIG. 6 is a front perspective view of a photographic copying machine according to the present invention, wherein an adjustable mask of the type shown in FIG. 5 is built into the cover of the apparatus.

In an alternative embodiment shown in FIG. 6, the adjustable mask is hinged to the underside of the cover 14 of the photographic print copying station 10 by a hinge 55. A photographic print 53 is placed behind the mask, and the mask is adjusted to provide the cropping desired. The cover is then closed and the copying station is actuated.

Figure 7:
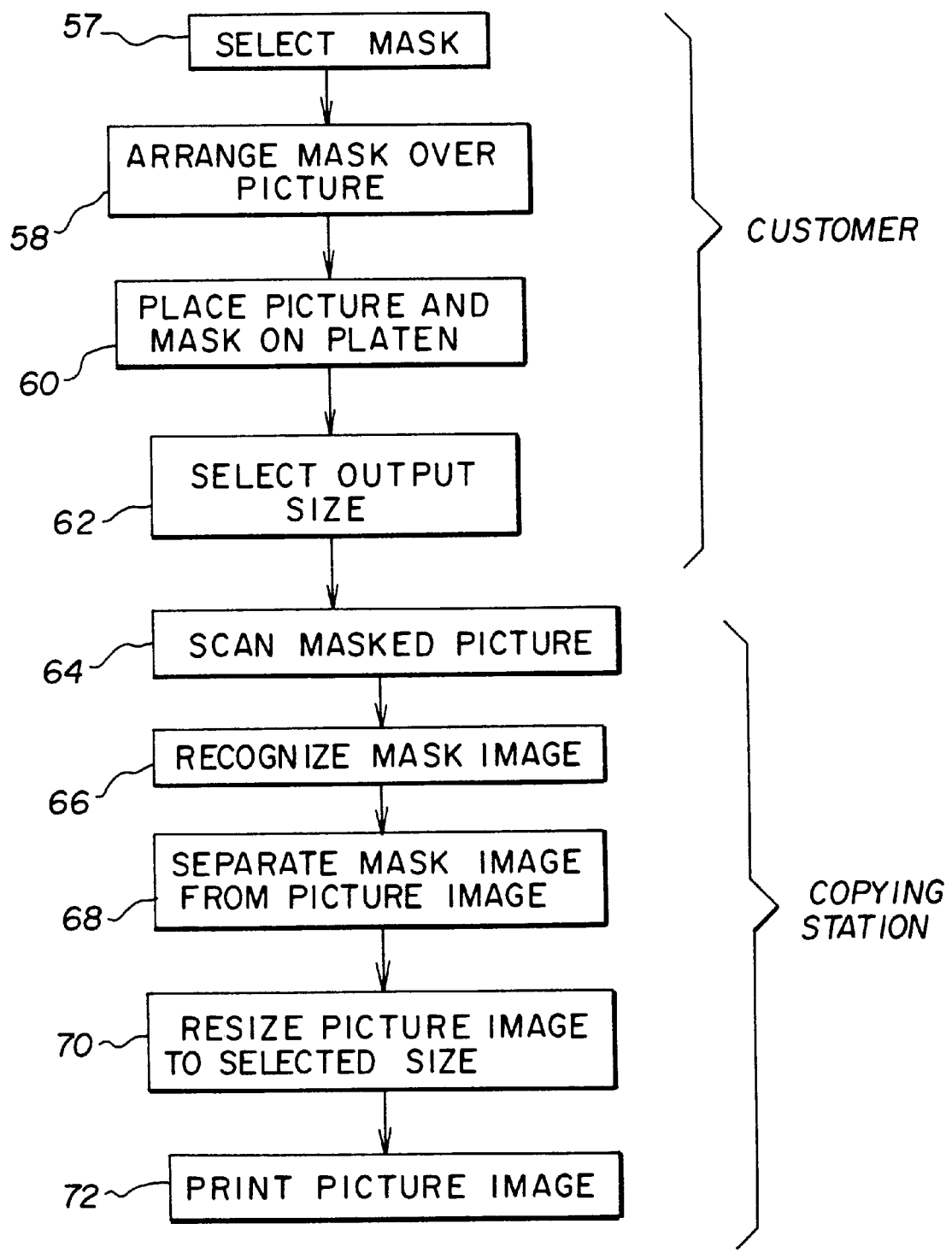
FIG. 7 is a flow chart showing the operation of the photographic copying station according to the present invention.

Turning to FIG. 7, the operation of the photographic print copying station will now be described. First, the customer selects a mask (57) and arranges the mask over the picture (58). The mask and picture are then placed (60) on the platen of the copying station, and the customer selects (62) the size of the output prints by pushing one of the buttons 20. The buttons may represent, for example, an 8×10, two 5×7's, four 4R size prints, or a page of wallet size prints.

When the output size selection button is pushed, the control electronics signal the scanner to scan (64) the masked picture on the platen. After the image of the mask and the picture have been captured by scanner 22, the signal processing and control electronics 32 recognizes the portion of the image representing the mask (66) and separates the image area from the mask (68), using one of the well known algorithms for determining an image area from a background. Once separated, the signal processing and control electronics 32 resizes the image area to the desired output size (70) and signals the printer 34 to print (72) the finished image. When more than one of the selected size images will fit on the paper, the signal processing and control electronics 32 automatically formats the image to produce multiple copies of the selected size image on the paper.

Figure 8:
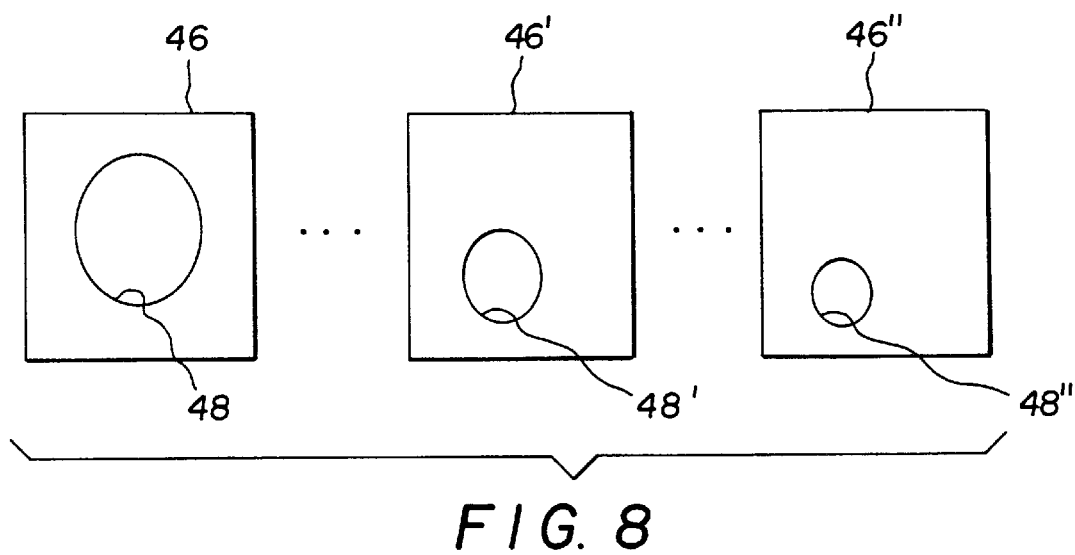
FIG. 8 is a top view of an alternative set of masks having oval shaped openings for providing an artistic effect in the copied image.

As shown in FIG. 8, different shaped openings, such as ovals can be provided in the masks to provide an artistic effect to the copied image. In this example, the oval has the same aspect ratio as the desired copy size.

The signal processing and control electronics may also apply sharpening filters to the digital image depending on the size of the input image. Additionally, the system may scan more than once on the basis of the size of the selected area. If the resolution of the scanner is variable, a first scan at a resolution sufficient for printing without enlargement (zooming) may be used. Upon determining a relatively small image area has been presented to the scanner, the system can rescan the image at a higher resolution to facilitate enlargement. Of course, a limiting factor in the quality of the reproduction will be the resolution of the input print, however, this is not under the control of the copying station.

Alternatively, a low resolution prescan unsuitable for printing might also be used to determine the desired print area. Using this technique, the scanner resolution would be increased for scanning even a full-size image, and increased more when a small area has been selected for printing by the masking process.

The invention has been described in detail with particular reference to certain preferred embodiments thereof, but it will be understood that variations and modifications can be effected within the spirit and scope of the invention.

PARTS LIST 10 photographic print copying station
12 platen 14 cover
16 eject tray
18 media supply door
20 control buttons
22 scanner
24 flash lamps
26 mirror
28 lens
30 image sensor
31 color filter wheel
32 signal processing and control electronics
34 color printer
36 paper supply
38 dye donor supply
40 dye donor take-up
42 print drum
44 print head
46 masks
48 apertures
50 picture
52 sleeve
53 photographic print
54 aperture
55 hinge
56 slide
57 select mask step
58 arrange mask over picture step
60 place picture and mask on platen step
62 select size of output step
64 scan image step
66 recognize mask step
68 separate image area from mask area step
70 resize image step
72 print copy step

What is claimed is:

1. A photographic print copying station, comprising:
   a) a scanner for scanning a photographic print;
   b) a mask located over the photographic print to indicate an area of the print for copying;
   c) operator control means for selecting a desired copy size;
   d) digital signal processor responsive to the signal produced by the scanner for recognizing the mask area, separating the image area from the mask area, and resizing the image area to the selected copy size to produce a resized digital image; and
   e) a printer responsive to the resized digital image from the digital signal processor for printing the selected copy.

2. The photographic print copying station claimed in claim 1, wherein the mask is a sheet of opaque material defining an opening.

3. The photographic print copying station claimed in claim 2, wherein the selected desired copy size has an aspect ratio, and the opening is a rectangle having the same aspect ratio as the selected desired copy size.

4. The photographic print copying station claimed in claim 2, wherein the opening is an oval, having the same aspect ratio as the selected desired copy size.

5. The photographic print copying station claimed in claim 1, wherein the mask is a size adjustable mask having a fixed aspect ratio.

6. The photographic print copying station claimed in claim 1, wherein the mask is distinctive color used in a chroma-key process.

7. The photographic print copying station claimed in claim 6, wherein the color of the mask indicates to a digital image processor a desired output format.

8. The photographic print copying station claimed in claim 6, wherein a machine readable code visible on the face of the mask indicates to a digital image processor a desired output format.

9. The photographic print copying station claimed in claim 1, wherein the operator control means is a button on the printer.

10. The photographic copying station claimed in claim 1, wherein the scanner includes a cover, and the mask is attached to the scanner cover.

11. A method of copying a photograph in a photographic print copying station, comprising the steps of:
   a) providing a scanner for scanning a photographic print;
   b) placing a mask over the photographic print to indicate an area of the print for copying;
   c) selecting a desired copy size;
   d) in a digital image processor, recognizing the mask area, separating the image area from the mask area, and resizing the image area to the selected copy size to produce a resized digital image; and
   e) printing the resized digital image at the desired copy size.

* * * * *